United States Patent [19]

Bernstein et al.

[11] Patent Number: 5,007,087
[45] Date of Patent: Apr. 9, 1991

[54] METHOD AND APPARATUS FOR GENERATING SECURE RANDOM NUMBERS USING CHAOS

[75] Inventors: Greg M. Bernstein, Fremont; Michael A. Lieberman, Berkeley, both of Calif.

[73] Assignee: Loral Aerospace Corp., New York, N.Y.

[21] Appl. No.: 510,359

[22] Filed: Apr. 16, 1990

[51] Int. Cl.$^5$ .................... H04L 9/04; H03K 3/84
[52] U.S. Cl. ............................. 380/46; 364/717
[58] Field of Search ............... 380/28, 46; 364/717; 331/78

[56] References Cited

U.S. PATENT DOCUMENTS

| | | | |
|---|---|---|---|
| 4,545,024 | 10/1985 | Maher et al. | 364/717 |
| 4,769,777 | 9/1988 | Bittle et al. | 364/717 |
| 4,799,259 | 1/1989 | Ogrodski | 384/46 |
| 4,810,975 | 3/1989 | Dias | 331/78 |
| 4,853,884 | 8/1989 | Brown et al. | 364/717 |
| 4,855,690 | 8/1989 | Dias | 331/78 |

OTHER PUBLICATIONS

Letham et al., "A 128K EPROM Using Encryption of Pseudorandom Numbers to Enable Read Access", *IEEE Journal of Solid State Circuits*, vol. SC-21, No. 5, pp. 881-888 (Oct. 1986).
Tang et al., "Synchronization and Chaos", *IEEE Transactions on Circuits and Systems*, vol. CAS-30 (Sep. 1983).
Oishi et al., "Pseudo-Random Number Generators and Chaos", *The Transactions of the IECE of Japan*, vol. E 65, No. 9, 09/82.
Shaw, "Strange Attactors, Chaotic Behavior, and Information Flow", *Z. Naturforschung*, vol. 36a, pp. 80-112 (1981).
G. M. Bernstein, *Nonlinear Oscillations, Synchronization and Chaos*, Ph.D thesis, University of California-Berkeley, 03/88.

*Primary Examiner*—Salvatore Cangialosi
*Attorney, Agent, or Firm*—Edward J. Radlo; Kenneth R. Allen

[57] ABSTRACT

Information-theoretic notions are employed to establish the predictability of a random number generated from a circuit exhibiting chaos in order to obtain a number from a sequence of numbers with a known level of randomness and security. The method provides a measure of information loss whereby one may select the number of iterations before or between bit sampling in order to extract a secure pseudo-random number. A chaotic output is obtained by use of a sample and hold circuit coupled in a feedback loop to a variable frequency oscillator, such as a voltage controlled oscillator circuit, and operated with a positive Lyapunov exponent. A source signal generator, such as a periodic wave generator, provides a driving signal to the sample and hold circuit.

15 Claims, 5 Drawing Sheets

METHOD AND APPARATUS FOR GENERATING SECURE RANDOM NUMBERS USING CHAOS

BACKGROUND OF THE INVENTION

This invention relates to random number generation and more particularly to a random number generator using a chaotic circuit. Random and pseudo-random numbers are used for purposes such as test-data generation, Monte-Carlo simulation techniques, generation of spreading sequences for spread spectrum communications and cryptography. The applications place constraints on how random numbers are generated. A main design criterion is whether the sequence needs to be repeatable. Repeatable pseudo-random number generators are implemented in digital hardware or software. As used herein a pseudo-random number generator refers to a deterministic device which generates a non-repeatable sequence of numbers, and not merely a device which generates a repeatable sequence which satisfies selected criteria of random behavior.

The security of a pseudo-random number generator, particularly a repeatable generator, is of paramount importance to the field of cryptography, where it is equivalent to the problem of finding a secure encryption method. The security of a pseudo-random or random number generator is a measure of how difficult it is to predict future values of the sequence based on past values of a sequence. The level of difficulty may be defined in computational or probabilistic terms depending on the type of generator.

For the present application, repeatability is not necessary and in fact is to be avoided, but security is a major concern. The present application includes key generation, which is used in cryptography, and various aspects of key management. Typically, such applications sample noise from reverse-biased diodes, oscillator phase noise or other physical phenomena. However, due to the difficulties encountered in dealing with diode noise sources (which are inherently bandlimited and have undesired aging and thermal characteristics), as well as other natural sources of noise, alternative deterministic circuits have been developed. However, deterministic generators, such as described by Letham et al., "A 128K EPROM Using Encryption of Pseudorandom Numbers to Enable Read Access," *IEEE Journal of Solid State Circuits*, Vol. SC-21, No. 5, pp. 881-888 (October 1986), are difficult to deal with because of the difficulty of determining whether the sequence is sufficiently random and secure and whether such circuits are easier to implement than smaller circuits that serve the same purpose.

In recent years a new science has developed in the field of nonlinear dynamics, more generally known as chaos. The nonlinear phenomenon of chaos poses a promising deterministic alternative for pseudo-random number generation due to its characteristic unpredictable behavior. Chaos, in fact, produces unpredictable behavior in a fairly predictable manner.

The application of chaos to number generation has been suggested in the past. In Tang et al., "Synchronization and Chaos," *IEEE Transactions on Circuits and Systems*, Vol. CAS-30 (September 1983), it was noted that there is a similarity between a map approximating a nonlinear forced oscillator and a map describing a linear congruential pseudo-random number generator. In Oishi et al., "Pseudo-Random Number Generators and Chaos," *The Transactions of the IECE of Japan*, Vol. E 65 (September 1982), it was shown how to use chaotic first-order difference equations to generate pseudo-random sequences with a prescribed distribution function. However, the security and predictability issue was not addressed.

The information loss properties of a chaotic system were first described by Shaw in "Strange Attractors, Chaotic Behavior and Information Flow," *Z. Naturforschung*, Vol. 36a, pp. 80-112 (1981). This important work showed the relationship between information and chaos, but it made no suggestion about potential applications, particularly in the field of key generation and management.

In G. M. Bernstein, *Nonlinear Oscillations. Synchronization and Chaos*, Ph.D. thesis, University of California-Berkeley (March 1988), there is mention of the potential use of chaotic circuits in security applications. However, there was no mechanism suggested therein for mathematically justifying the level of security of chaotic behavior of nonlinear circuitry. Such justification is necessary in order to determine the level of security attained.

What is needed is a method for generating a measurably secure, nonrepeatable pseudo-random number for applications requiring a random number.

The following patents were uncovered in a search of the records of the U.S. Patent and Trademark Office: U.S. Pat. No. 4,545,024 describes a hybrid natural random number generator which requires the use of a white-noise source, namely, a band-limited, stationary, white Gaussian noise signal such as that which is available from a number of commercial noise diodes. It is known that noise-diode statistical properties tend to change with age, which can degrade the security of a device using such a generator. In addition, the use of a noise diode requires at least one component to be added to the circuit which is not adapted to integration into a single integrated circuit.

U.S. Pat. No. 4,769,777 describes an unpredictable bit stream generator using a scheme of linear shift registers and number generators to produce random bits from pseudo-random bits. This is an alternative approach which represents a substantially greater complication than is required of the present invention.

U.S. Pat. No. 4,799,259 describes a monolithic random digital noise generator involving a collection of oscillators at incommensurate frequencies, i.e., frequencies which are not related by a rational number. The predictability of this generator is not analyzed, and it can be shown that the random digital noise generator would be predictable if the initial frequencies and phases of the oscillators were known to a reasonable precision. The circuit described therein has a different theoretical basis than the present invention.

U.S. Pat. No. 4,810,975 describes a random number generator using sampled output of a variable-frequency oscillator. The invention described therein is similar to the foregoing, but it is subject to a different explanation of operation. The circuit used therein is a triangle wave oscillator used to frequency modulate a second oscillator, which then produces a complicated waveform, which is then sampled to produce numbers taken as random numbers. As with the foregoing references, the principle herein is to produce a waveform whose frequency spectrum approximates a band-limited white-noise source which is thereafter sampled. It is subject to the same limitations on security as the foregoing references.

U.S. Pat. No. 4,855,690 describes an integrated circuit random number generator using the sampled output of a variable-frequency oscillator. This is a continuation application of the foregoing '975 patent.

U.S. Pat. No. 4,853,884 describes a random number generator with digital feedback. Therein a noise-diode-based circuit is employed. It has the same drawback as previously identified, namely, the requirement of a separate noise-diode component and bias circuitry. This method is not suitable for integration with other cryptographic functions on a single chip.

SUMMARY OF THE INVENTION

According to the invention, information-theoretic notions are employed to obtain a sequence of numbers generated by a circuit exhibiting chaos in order to obtain numbers with a known level of randomness and security. For a generator implemented using a deterministic circuit exhibiting chaos, the method according to the invention provides a measure of information loss whereby one may select the number of iterations before or between extraction of a bit. Two cases are considered. In the first case, no prior information concerning the initial conditions of a continuously running circuit is known. In the second case, knowledge of the initial conditions at startup is known.

A circuit exhibiting chaos useful according to the invention may be realized by use of a sample and hold circuit coupled in a feedback loop to a variable frequency oscillator, such as a voltage controlled oscillator circuit, and operated with a positive Lyapunov exponent. A source signal generator, such as a periodic wave generator, provides a necessary driving signal to the sample and hold circuit.

The invention would be better understood by reference to the following detailed description in connection with the accompanying drawings.

DESCRIPTION OF THE SPECIFIC EMBODIMENTS

Figure 1:
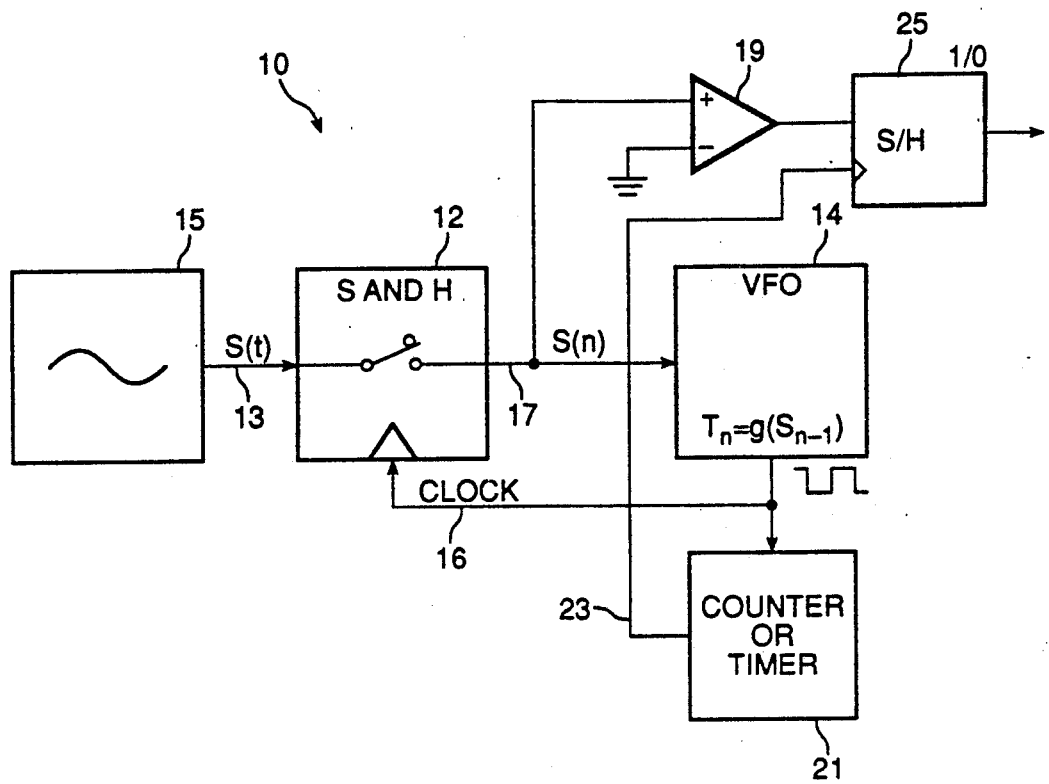
FIG. 1 is a block diagram of a deterministic circuit which can be operated as a random number generator according to the invention.

FIG. 1 is a block diagram of a random number generator 10 comprising a sample-and-hold circuit (sampler) 12 coupled to receive a periodic signal from a source generator 15, such as a sinusoidal signal source, to supply a signal to a variable-frequency oscillator 14 which produces a digital square wave output used as a clock in a feedback path 16 to the sample-and-hold circuit 12. This is a simple deterministic synchronization system that can exhibit chaos. The input signal on line 13 is defined by $s(t) = h(\omega_1 t + \theta_0)$, where h is a $2\pi$ periodic function, $\omega$ is the frequency of operation and $\theta$ is the initial phase. The input signal $s(t)$ has angular frequency $\omega_1$ and an initial phase angle of $\theta_0$. The sampler 12 is assumed to be ideal and is clocked by the square wave output of the variable-frequency oscillator (VFO) 14 at time $t_n$. The output signal on line 17 from the sampler 12 is given by the expression: $s_n = h(\omega_1 t_n + \theta_0)$. This signal may be a voltage, a current, a digital word or any other signal, depending on the type of input required of the VFO 14. (An output signal could also be extracted at the output of the VFO 14.)

The VFO 14 comprises a control unit which sets the period for oscillation given by the expression: $T_{n+1} = t_{n+1} - t_n = g(s_n)$ The output herein is an irregular rectangular waveform.

The random number generator 10 is based on the circuitry of a first-order phase-locked loop. The random number is derived from the phase-error variable $\phi$. The circuit is described theoretically in the Bernstein thesis, which is incorporated herein by reference and made a part hereof.

The equation for the $(n+1)^{th}$ period, given by the expression $T_{n+1}$ is given by the expression $$T_{n+1} = g(h(\omega_1 t_n + \theta_0)) \tag{1}$$

The phase-error variable may be defined as $\phi_n = \omega_1 t_n + \theta_0$. Consequently, the expression for the n+1 iteration of $\phi$ is given by:

$$\phi_{n+1} = \phi_n + \omega_1 g(h(\phi_n)) \tag{2}$$

In the situation where the input signal is a sinusoid, for example, given by the expression:

$$s(t) = A_m \sin(\omega_1 t + \theta_0),$$

and where the variable-frequency oscillator 14 is a voltage-controlled oscillator (VCO) whose frequency is linearly related to its control voltage:

$$T_{n+1} = 1/(f_{off} + b s_n),$$

where $f_{off}$ is the offset frequency and b is the voltage-to-frequency conversion constant of the VCO, then the circle map defined by this digital phase-locked loop is given by:

$$\phi_{n+1} = \phi_n + \frac{k}{1 - A \sin \phi_n} = f(\phi_n). \tag{3}$$

where $k = \omega_1/f_{off}$ and $A = -bA_m/f_{off}$.

Figure 2:
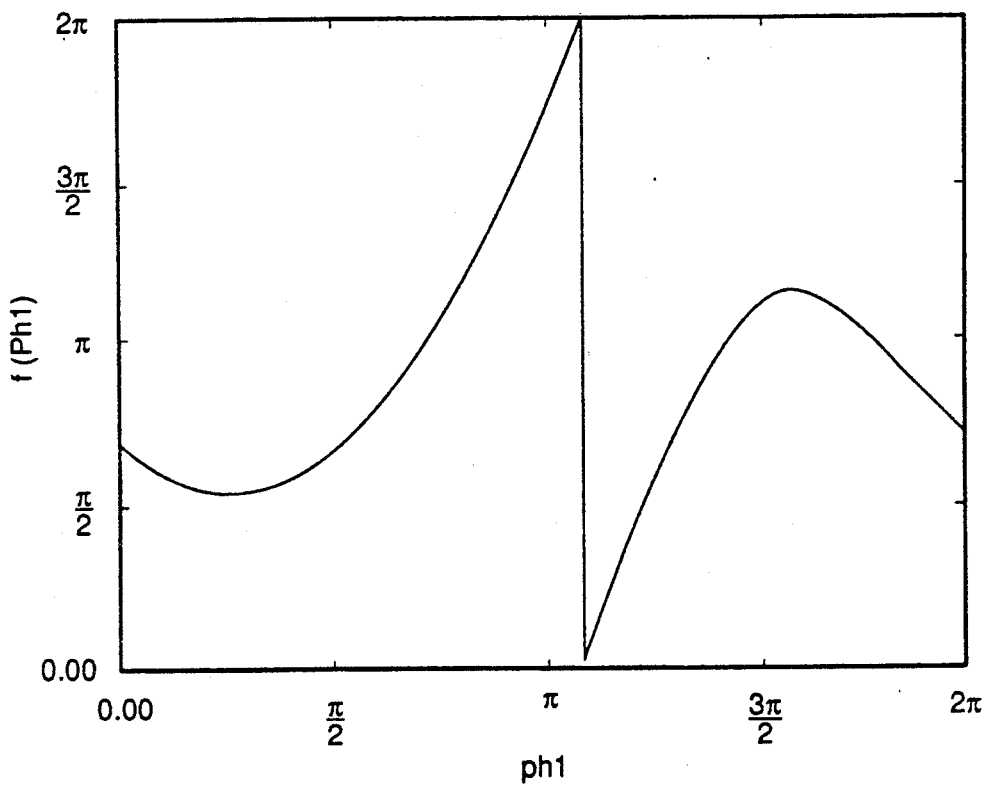
FIG. 2 is a graph of a circle map corresponding to the random number generator according to the invention.

FIG. 2 is an example of a circle map which will be useful for understanding the level of security of the circuit. The x and y axes represent the parameters of $\phi$ with respect to $f(\phi)$ over a range of $2\pi$ on each axis. It is best visualized as a plot in the surface of a torus. The plot appears as a spiral on the surface of a donut.

The security of the generator according to the invention can be justified by the information loss properties of chaos. Fundamental to definitions of chaos is the concept of the sensitivity to initial conditions, that is, the fact that any two trajectories of the system, no matter how closely they start to one another, will eventually diverge, and such divergence will be of exponential order. A measure of divergence of trajectories of a dynamical system is the Lyapunov exponent. The Lyapunov exponent is a measure of the average rate of divergence of nearby trajectories. A positive Lyapunov exponent indicates chaos.

Using the parametric values $A = -0.25$ and $k = 8.5$ in the immediately foregoing equation, which were specifically chosen to yield a positive Lyapunov exponent, it is found that the circuit 10 of FIG. 1 is chaotic. Its Lyapunov exponent can be verified and calculated in accordance with procedures given in the prior art, as for example in Shaw, cited hereinabove. The Lyapunov exponent is given by the expression:

$$\lambda = \lim_{n \to \infty} \frac{1}{n} \sum_{i=0}^{n} \log_2 |df/d\phi(\phi_i)| \quad (4)$$

Allowing the value n to equal 100,000 in the foregoing equation yields a Lyapunov exponent of $\lambda = +0.760$, which is a positive Lyapunov exponent, independent of the initial choice of $\phi$.

Most chaotic circle maps are ergodic (i.e., can be characterized by a probability distribution) and possess an equilibrium invariant distribution. This distribution can be obtained for example by iterating the established probability distribution for $\phi$, that is:

$$p_{n+1}(\phi_{n+1}) = \frac{p_n(\phi_{n1})}{|df/d\phi|_{\phi n1}|} + \frac{p_n(\phi_{n2})}{|df/d\phi|_{\phi n2}|} + \ldots, \quad (5)$$

where f is the function that takes $\phi_n$ to $\phi_{n+1}$, and $\phi_{n1}$, $\phi_{n2}$, . . . are the points such that $\phi_{n+1} = f(\phi_{n1}) = f(\phi_{n2}) = \ldots$. The derivative of f is evaluated at the points $\phi_{n1}$, $\phi_{n2}$, etc.

Figure 3:
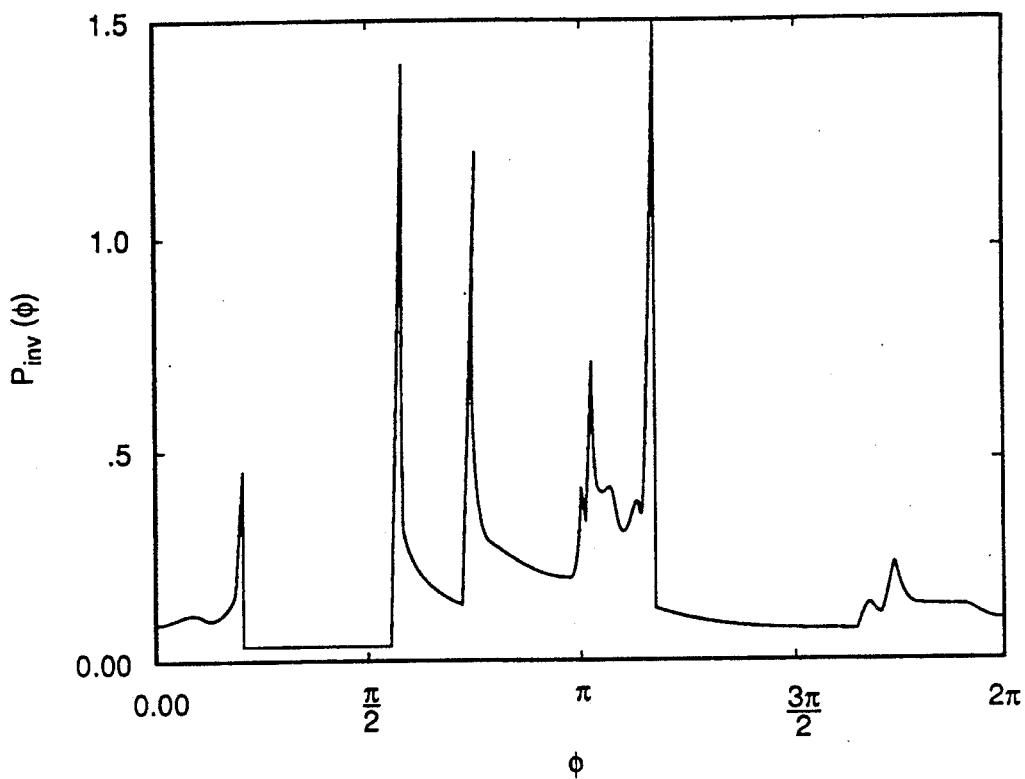
FIG. 3 is a probability distribution for a phase difference according to the invention where there is no prior information concerning the state of the circuit.

FIG. 3 shows the invariant distribution obtained by starting with a uniform density, setting resolution to 1,000 points and iterating the foregoing probability distribution twenty times (i.e., iterating n from 0 to 20). Ergodicity implies that time averages equal space averages. Hence, in addition to equation (4) for $\lambda$ above, we can obtain the Lyapunov exponent from the expression $$\lambda = \int_0^{2\pi} \log_2 |df/d\phi(\phi)| p_{inv}(\phi) d\phi, \quad (6)$$

where $P_{inv}(\phi)$ is the equilibrium invariant distribution. Calculated by this method, the Lyapunov exponent is $\lambda = 0.759$. This value compares almost exactly with the value obtained using the methods of Equation 4 above.

In order to obtain random bits from a chaotic circuit 10 for use in random number generation; one takes from the output 17 of the sampler 12 of FIG. 1 and applies it to a comparator 19 to select based on positive and negative signals. The comparator 19 assigns levels which are readable as bit values of one or zero based on whether the output of the sampler 12 is positive or negative. Hence, $\phi \epsilon [0,\pi)$ corresponds to a "1" and: $\phi \epsilon [\pi, 2\pi)$ corresponds to a "0", assuming $A_m$ is positive. The output of the comparator 19 is sampled after a preselected length of time or more precisely after the level of information has fallen below a preselected threshold. To this end a counter 21 may count the number of iterations on feedback line 16, or a simple timer such as a one-shot, may be substituted for the counter 21 to assure that an extraction signal is issued (via line 23) at appropriate intervals. The extraction signal may for example trigger a signal pickoff device 25, such as an AND gate or a D-type flip-flop, to pass the output of the comparator 19 as the desired random number sequence.

Examining the results graphically depicted in FIG. 3, it is found that the probability of obtaining a logic value 1 is 0.5136 (the area under the trace between 0 and $\pi$).

It is now possible to use information-theoretic notions to describe the predictability of a random number generated from the foregoing circuit 10 of FIG. 1.

At a preselected instant of time, a certain amount of information is known about the state of the circuit 10 of FIG. 1. As time progresses, and in the absence of further information, this information decreases in a chaotic circuit 10. Assigning probabilities p1 to the m possible outcomes, the information associated with an outcome or measurement is defined in an experiment as:

$$H = - \sum_{i=1}^{m} p_i \log_2 p_i, \quad (7)$$

where H is the parameter of "information" in units of bits, or in other words a measure of uncertainty. Where $H = 0$, there is total uncertainty. Increasing the accuracy of the measurement increases the information obtained in the following way. Suppose the outcome of the measurement lies in an interval of the real line, and the interval is broken into m equally-sized pieces, with the probability of the outcome in any particular piece being $1/m$. Then the information associated with the measurement is:

$$H = - \sum_{i=1}^{m} 1/m \log_2 (1/m) \equiv \log_2 m. \quad (8)$$

Thus, the finer the measurement resolution, the more information is obtained about the system. For the random number generator circuit 10, knowledge of the state of the system can be expressed in terms of a probability distribution $p(\phi)$. With that distribution the amount of information known about the state can be calculated, relative to the invariant distribution (see Shaw, above).

The information is given by:

$$H_p = \int_0^{2\pi} p(\phi) \log_2 [p(\phi)/p_{inv}(\phi)] d\phi. \quad (9)$$

The above integral is evaluated over the subset of $[0, 2\pi)$, where $P_{inv}(\phi) \neq 0$.

In the above-cited reference to Shaw, it is shown that the average rate of information loss in a chaotic system is equal to the Lyapunov exponent. Thus, the number of iterations $n_{loss}$ for complete loss of information $H_p$ is $$n_{loss} \approx \frac{H_p}{\lambda} . \tag{10}$$

This formula is valid when λ is much less than the initial information. There is however is a significant reduction in the rate of loss of information as the information asymptotically approaches zero.

EXAMPLE 1: CONTINUOUSLY RUNNING CIRCUIT

Figure 4:
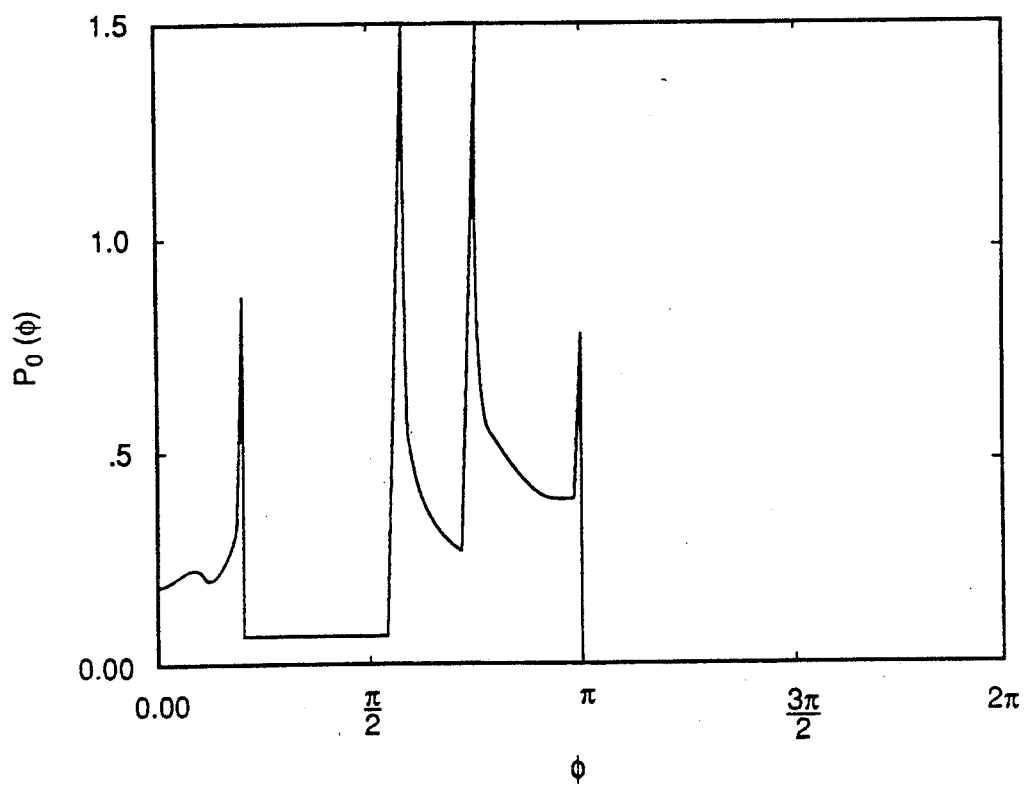
FIG. 4 is a probability distribution for a phase difference according to the invention where a value "1" has been observed.

Suppose a chaotic circuit such as circuit 10 has been running a sufficient length of time that there is no remaining information about initial conditions. Under the assumption that the generated bit stream has not been observed, the equilibrium invariant distribution of FIG. 3 is the probability density of $\phi$. If an observation is made or a bit is taken—for example, a "1" is observed—then this changes the amount of information known about the system. The probability distribution corresponding to this information is shown in FIG. 4. It will be observed that FIG. 4 is merely the invariant distribution truncated and rescaled corresponding to the knowledge that $\phi \epsilon [0,\pi)$, i.e., a "1" bit. The information in this distribution can be computed using Equation 9.

If the circuit 10 is run so that the chaotic system is iterated without making subsequent observations, then the information available to an observer concerning the state of the circuit decreases, which implies decreased ability to predict future circuit behavior. Table I, illustrates the change in information and probabilities with iterations of the chaotic circuit 10. The initial observation is of a "1" bit at Iteration 0. Column 1 is the iteration number. Column 2 is the probability that the phase-error parameter $\phi$ is in the range 0 to $\pi$, and Column 3 is the information H (in bits) obtained from Equation 9, the measure of uncertainty. The probability of seeing a "1" changes (approaching 0.5) and the amount of information decreases (to zero bits) as the system is iterated.

TABLE I

| Iteration | Prob ($\phi \epsilon [0,\pi)$) | Information (H) |
| --- | --- | --- |
| 0 | 1.000 | 0.9612 |
| 1 | 0.5171 | 0.5132 |
| 2 | 0.4567 | 0.1807 |
| 3 | 0.4601 | 0.1227 |
| 4 | 0.5600 | 0.08184 |
| 5 | 0.5612 | 0.05517 |
| 6 | 0.4529 | 0.02937 |
| 7 | 0.5083 | 0.01627 |
| 8 | 0.5336 | 0.00803 |

Figure 5:
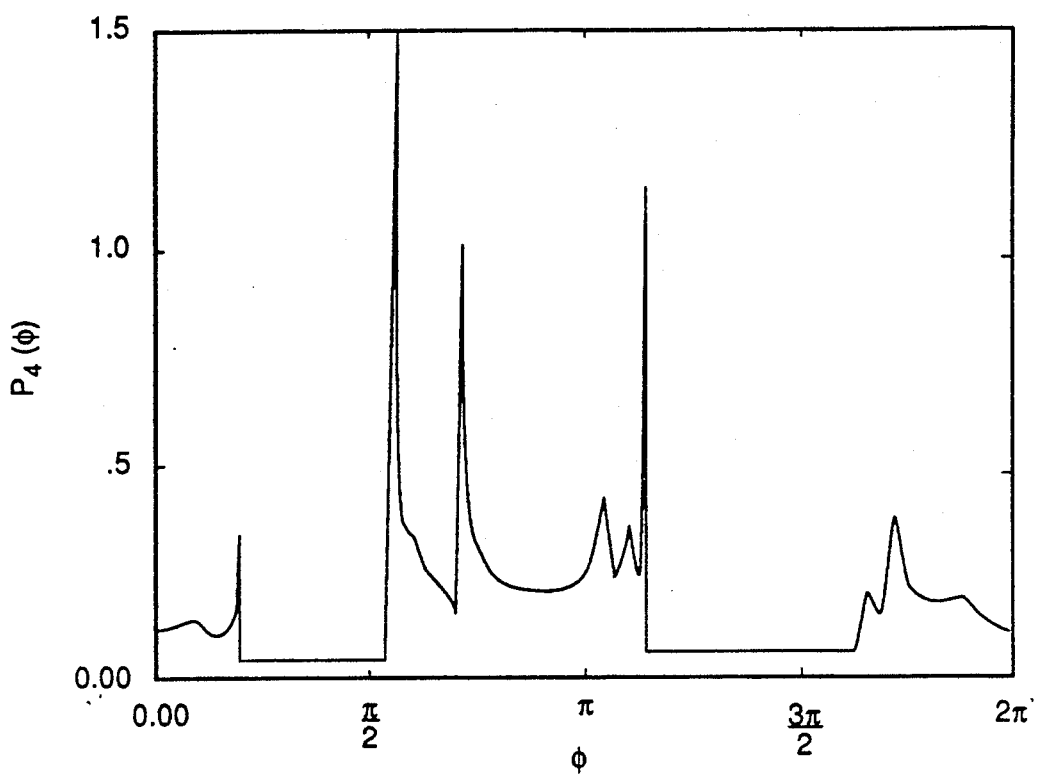
FIG. 5 is a probability distribution for a phase difference according to the invention where there is information at selected prior times.

After 4 iterations, as shown in FIG. 5, the probability distribution of the system relaxes toward the invariant distribution (FIG. 3) as the circuit is iterated. Since λ is relatively close to the value of the initial information, Equation 10 is not applicable. However, from FIG. 4 and FIG. 5, it can be seen that the distribution quickly converges to the invariant distribution of FIG. 3. The value H is a measure of the difference between the invariant distribution and the Hence, to use circuit 10 of FIG. 1 as a secure random number generator according to the invention, it is best not to take or extract bits from the output 17 more than once in at least four and preferably at east eight iterations rather than simply observing after two iterations as would be indicated by Equation 10.

EXAMPLE 2: CIRCUIT WITH KNOWN INITIAL CONDITIONS

Consider the condition of the chaotic circuit 10 when turned on such that the initial conditions are known approximately (i.e., within measurement accuracy). For example, suppose the initial phase error $\phi$ is in the vicinity of zero, i.e., the initial probability distribution of $\phi$ is $$P_{initial}(\phi) = \begin{cases} 100/2\pi & \text{if } |\{\phi\}| < 2\pi/100 \\ 0 & \text{otherwise} . \end{cases} \tag{11}$$

From Equation 9 the initial information is $H_{initial} = 7.37$ bits. Table II shows how this initial information is lost as the circuit 10 is iterated runs in the absence of additional observations, given the conditions $A = 0.3$ and $k = 8$.

TABLE II

| Iteration | Prob ($\phi \epsilon [0,\pi)$) | Information (H) |
| --- | --- | --- |
| 0 | 0.5000 | 7.3679 |
| 1 | 1.0000 | 6.3039 |
| 2 | 1.0000 | 4.8427 |
| 3 | 0.0000 | 4.8030 |
| 4 | 0.0000 | 4.2232 |
| 5 | 1.0000 | 4.1946 |
| 6 | 1.0000 | 3.8269 |
| 7 | 1.0000 | 3.3719 |
| 8 | 0.0000 | 2.5883 |
| 9 | 0.1601 | 2.5470 |
| 10 | 0.5641 | 1.3303 |
| 11 | 0.1602 | 1.1035 |
| 12 | 0.5130 | 0.5482 |
| 13 | 0.3637 | 0.4969 |
| 14 | 0.6748 | 0.2954 |
| 15 | 0.6056 | 0.1406 |
| 16 | 0.5076 | 0.08795 |
| 17 | 0.5055 | 0.05720 |
| 18 | 0.4970 | 0.03467 |

Figure 6:
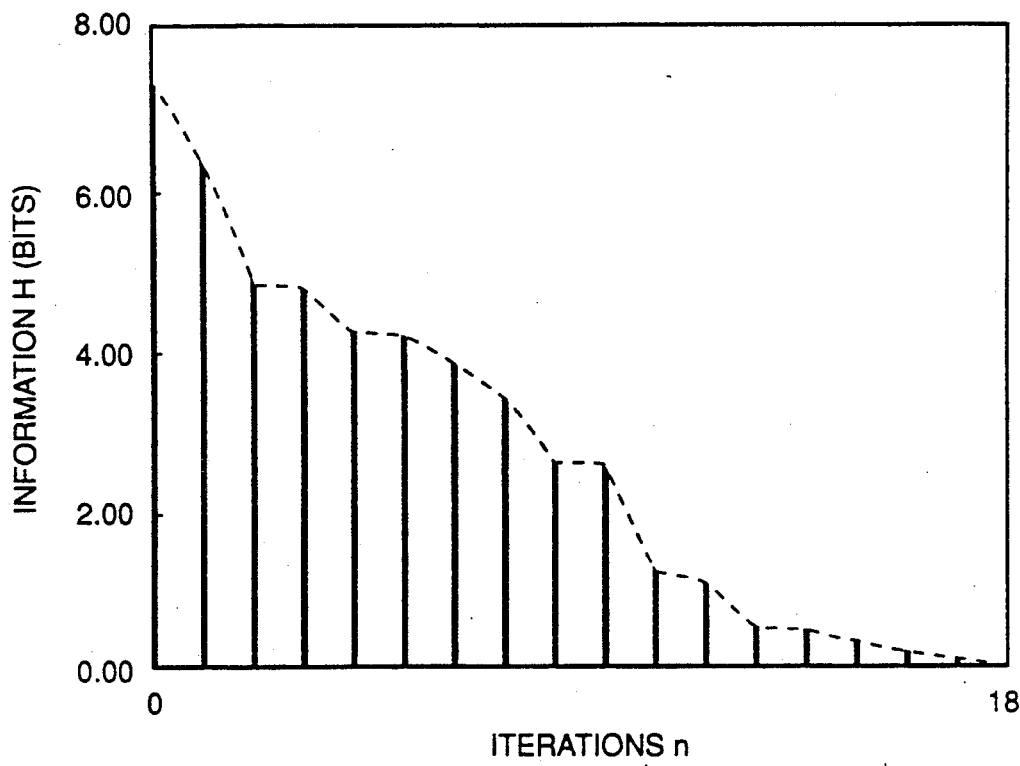
FIG. 6 is a diagram relating information to iterations of the circuit operating according to the invention.

FIG. 6 illustrates Table II, showing how the information (in the absence of any additional observations) decreases with each iteration. Equation 10 provides some guidance but is not sufficient to guarantee randomness. It gives $n_{loss} = 9.71$, or approximately 10 iterations. However, after only 8 iterations, randomness is apparent in $\phi$. After 15 iterations, H falls below 0.1 bit. Table II further shows that after 12 iterations the information left H is roughly equal to the Lyapunov exponent of 0.759. After so many iterations, the rate of loss of information decreases asymptotically toward zero. This can be observed in the trend shown in FIG. 6. By $2*n_{loss}$ (19 or 20) iterations, the initial probability has essentially relaxed to the invariant distribution, and hence, it is clearly safe to start taking bits, i.e., observing the output 17. It is interesting to note that although the initial probability of a "1" is 0.5000, it is known with complete certainty what the next eight bits will be. Hence, from a security standpoint it is important to wait for the initial probability distribution to relax to the invariant distribution.

Figure 7:
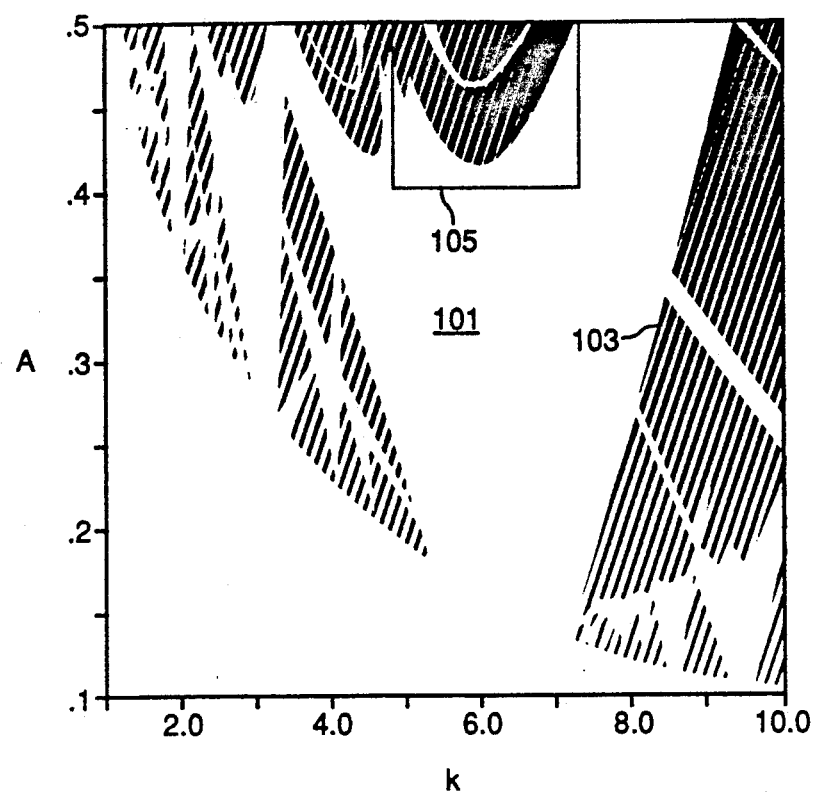
FIG. 7 is a diagram of parameters A vs. K on a first scale illustrating regions of chaos and of convergence.
Figure 8:
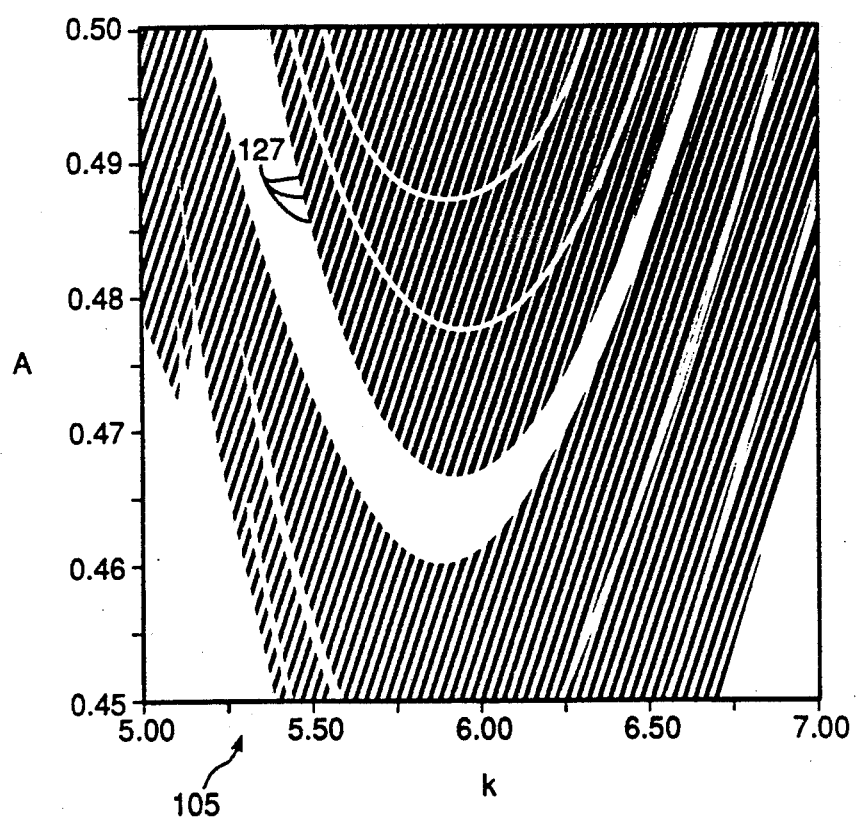
FIG. 8 is a diagram of parameters A vs. K on a second scale illustrating regions of chaos and of convergence.

The Lyapunov exponent of a chaotic circuit can be sensitively dependent on the value of system parameters. For the present application there is interest in determining where in parameter space a given circle map has a positive Lyapunov exponent. FIG. 7 represent (in the shaded areas) regions in the k,A plane where the map of the experimental digital phase-locked loop can have a Lyapunov exponent greater than $10^{-3}$, i.e., is close to but greater than zero. This is actually a fractal pattern, which means that the resolution of the figure cannot be fully represented in the scale observed. Regions indicative of periodic behavior are not shaded. For example, the region 101 defined by the bounds $2\pi(1-A) \leq k \leq 2\pi(1+A)$ contains a fixed point which gives the main white section in the middle of FIG. 7. This is a region where the Lyapunov exponent is negative, i.e., where the circuit 10 is non-chaotic. The darkened segments, such as region 103, are regions where the circuit 10 is chaotic. If a region 105 in parameter space containing positive Lyapunov exponents is examined more closely, as in FIG. 8, thin white regions are observed. These are periodic windows that possess negative exponents. As long as the periodic windows are thin enough, nonchaotic behavior will not be observed, due to the fluctuations in the system parameters.

Figure 9:
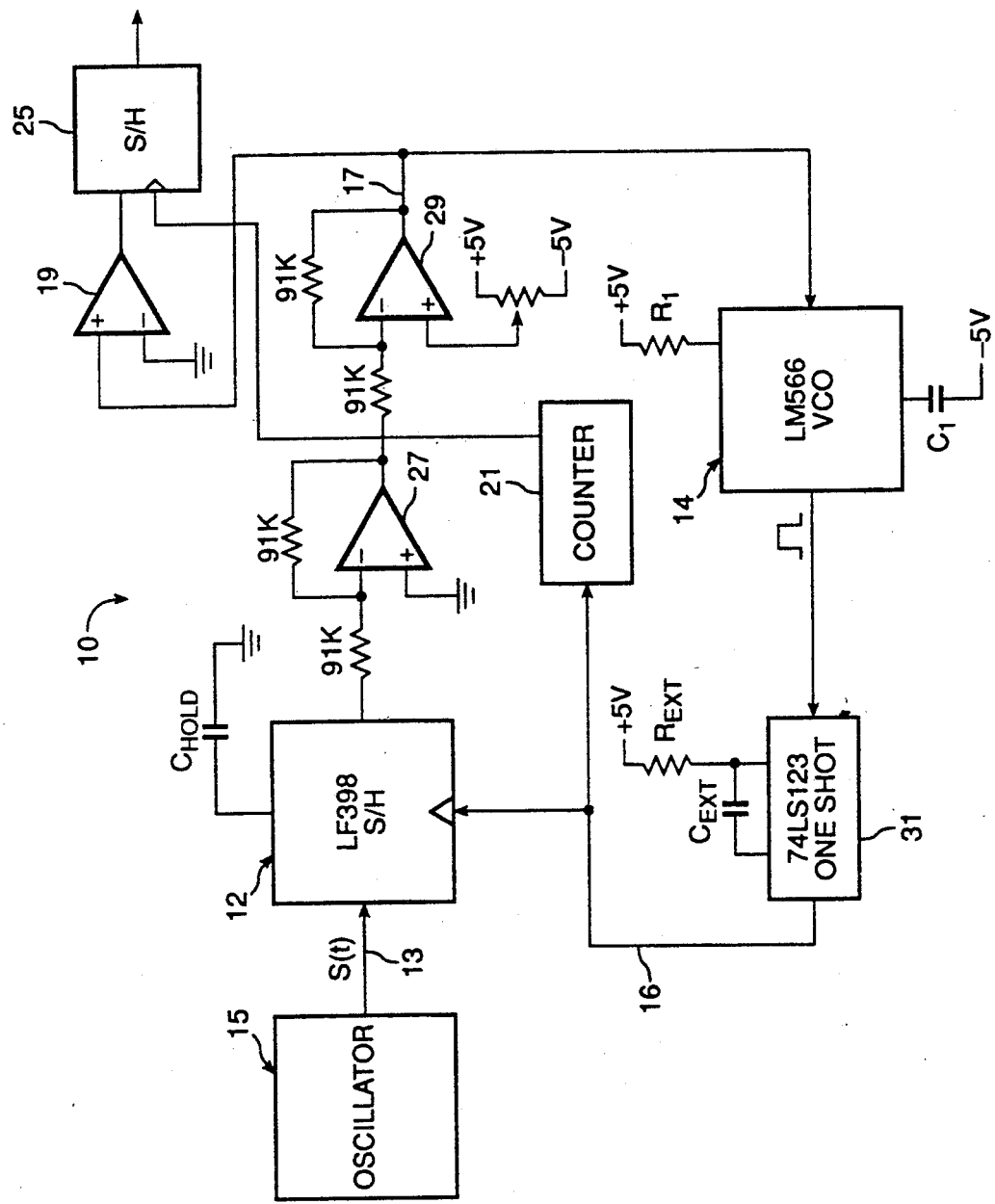
FIG. 9 is a schematic block diagram of a deterministic circuit based on FIG. 1 which can be operated as a random number generator according to the invention.

A schematic of a practical realization of a circuit 10 which can exhibit chaos based on FIG. 1 is shown in FIG. 9. An oscillator 15 is coupled to a sample and hold circuit 12, such as a type LF398, the output of which is coupled to a op amp-based buffer 27 and to level adjuster 29. The level adjuster output 17 is fed to a comparator 19 and to a VCO-type VFO 14, such as an LM566. The comparator feeds one input of a sample and hold device 25, the other input of which is coupled to the output 23 of a counter 21. The VFO 14 drives a one shot 31 such as a type 74LS123 device, whose output 16 is the clock input to the sample and hold 12 and to the counter 21. The carry output of the counter 21 asserts the sampling by sample and hold device 25 causing it to read the output of the comparator 19 and pass it out as a random bit sequence. (The sample and hold may be a two-level device providing a binary output, such as a three-state logic device.)

The algorithm of Wolf et al. ("Determining Lyapunov Exponents from a Time Series," *Physica* 16D, pp. 285–317 (1985)) may be used to estimate the Lyapunov exponent from the measured data series of the circuit 10. The parameters k and A may be varied experimentally by varying the frequency and amplitude of the oscillator 15.

The invention has now been described with reference to specific embodiments. Other embodiments will be apparent to those of ordinary skill in the art. For example, the sample principles herein described apply to any circuit which exhibits a positive Lyaponov exponent and can be characterized by an invariant distribution. It is, therefore, not intended that the invention be limited, except as indicated by the appended claims.

What is claimed is:

1. A method for generating a random number from a circuit, said circuit exhibiting a positive Lyaponov exponent and characterizable by an invariant probability distribution, said method comprising:
    operating said circuit with said positive Lyapunov exponent such that operation is chaotic; and
    after an interval, extracting a value of a state of said circuit at selected intervals as a random number sequence, said intervals selected to have a specified degree of uncertainty.

2. The method according to claim 1, wherein said extracting step is constrained to occur after a preselected number of samplings of a periodic signal of said circuit such that the probability distribution of the value of said state approaches the invariant distribution.

3. The method according to claim 1, wherein said extracting step is constrained to occur after a preselected time delay related to said probability distribution.

4. The method according to claim 1, wherein said extracting step is constrained to occur after the measure of information (H) of said state is less than about 0.1 bit.

5. The method according to claim 2, wherein said extracting step is constrained to occur after at least 10 iterations of said sampling.

6. A method for generating a random number from a deterministic circuit, said deterministic circuit comprising a signal source means for producing a source signal, first sampling means having a sample control input and a signal input coupled to said periodic signal source means, variable frequency oscillator means coupled to receive a representations of a sampled output of said first sampling means for generating a binary-valued signal having a frequency and phase state $\phi$ derived from said sampled output, and feedback means for feeding back in a feedback loop said binary-valued signal to control said sample control input of said first sampling means, said method comprising:
    operating said deterministic circuit with a positive Lyapunov exponent such that operation is chaotic;
    iteratively sampling said periodic source signal at sample times determined by level of said binary-valued signal; and
    after an interval, extracting a binary value of a signal in said feedback loop at intervals as a random number sequence having a specified degree of uncertainty.

7. The method according to claim 6, wherein said extracting step is constrained to occur after a preselected number of samplings of said periodic signal such that the probability distribution of the phase difference between the sampled signal and the periodic source signal approaches the invariant distribution.

8. The method according to claim 6, wherein said extracting step is constrained to occur after a preselected time delay permitting the number of samplings of said periodic signal to establish the probability distribution of the phase difference between the sampled signal and the periodic source signal approaching the invariant distribution.

9. The method according to claim 6, wherein said extracting step is constrained to occur after the measure of information (H) of the state $\phi$ of said circuit is less than 0.1 bit.

10. The method according to claim 7, wherein said extracting step is constrained to occur after the measure of information (H) of the state $\phi$ of said circuit is less than 0.1 bit.

11. The method according to claim 7, wherein said extracting step is constrained to occur after at least 10 iterations of said sampling step.

12. The method according to claim 7, wherein there is no prior knowledge of the state $\phi$ (H=0), wherein said extracting step is constrained to occur after at least 10 iterations of said sampling step.

13. The method according to claim 7, wherein said extracting step is constrained to occur after at least 15 iterations of said sampling step.

14. The method according to claim 7, wherein there is knowledge about the state $\phi$ at some prior sampling, wherein said extracting step is constrained to occur after at least 15 iterations of said sampling step.

15. An apparatus for generating a random number from a deterministic circuit comprising:

periodic signal source means for producing a periodic source signal;

first sampling means having a sample control input and a signal input coupled to said periodic signal source means;

variable frequency oscillator means coupled to receive a representation of a sampled output of said first sampling means for generating a binary-valued signal having a frequency and phase state $\phi$ derived from said sampled output;

feedback means for feeding back in a feedback loop said binary-valued signal to control said sample control input of said first sampling means;

means for constraining operation of said deterministic circuit with a positive Lyapunov exponent through sampling said periodic source signal at sample times determined by level of said binary-valued signal such that operation is chaotic; and means coupled to a node in said feedback loop for extracting a binary value of a signal in said feedback loop after an interval, in order to form a random number sequence having a preselected degree of uncertainty.

* * * * *